US012586963B2

(12) United States Patent
Cudak et al.

(10) Patent No.: US 12,586,963 B2
(45) Date of Patent: Mar. 24, 2026

(54) ELECTRICAL CONNECTOR HAVING AN ANOMALY ALERT SYSTEM AND A BRITTLE MEMBRANE

(71) Applicant: LENOVO (SINGAPORE) PTE. LTD, New Tech Park (SG)

(72) Inventors: Gary D. Cudak, Raleigh, NC (US); John M. Petersen, Wake Forest, NC (US); Nathan Peterson, Oxford, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 794 days.

(21) Appl. No.: 17/871,938

(22) Filed: Jul. 24, 2022

(65) Prior Publication Data

US 2024/0030662 A1 Jan. 25, 2024

(51) Int. Cl.

| | |
|---|---|
| ***H01R 13/70*** | (2006.01) |
| ***H01R 13/66*** | (2006.01) |
| ***H01R 13/717*** | (2006.01) |
| ***H01R 24/60*** | (2011.01) |
| ***H01R 107/00*** | (2006.01) |

(52) U.S. Cl.
CPC ......... *H01R 13/70* (2013.01); *H01R 13/6691* (2013.01); *H01R 13/7175* (2013.01); *H01R 24/60* (2013.01); *H01R 2107/00* (2013.01)

(58) Field of Classification Search
CPC ................ H01R 13/6691; H01R 13/70; H01R 13/7175; H01B 7/32
USPC ........................................................... 439/488
See application file for complete search history.

(56) References Cited

U.S. PATENT DOCUMENTS

| | | | | |
|---|---|---|---|---|
| 5,035,644 A * | 7/1991 | Nakazato | H01R 13/641 | 200/51.09 |
| 5,041,017 A * | 8/1991 | Nakazato | H01R 13/641 | 439/352 |
| 6,241,542 B1 * | 6/2001 | Nishide | H01R 13/7032 | 439/489 |
| 6,431,906 B1 * | 8/2002 | Belopolsky | H01R 13/7175 | 439/490 |
| 7,297,024 B2 * | 11/2007 | Ni | H01R 24/62 | 439/607.23 |
| 7,429,188 B2 * | 9/2008 | Wu | H01R 13/6658 | 439/490 |
| 8,094,019 B1 * | 1/2012 | Kelsch | G08B 13/1454 | 340/568.4 |
| 8,810,255 B2 * | 8/2014 | Williams | H01B 1/04 | 324/543 |
| 2005/0260884 A1 * | 11/2005 | Yueh | H01R 13/6691 | 439/488 |

(Continued)

*Primary Examiner* — Abdullah A Riyami
*Assistant Examiner* — Amara Anderson
(74) *Attorney, Agent, or Firm* — Carroll, Hoette & Butscher, LLC; Joseph M. Butscher

(57) ABSTRACT

An electrical connector includes a housing including a main body and an outer shield extending from the main body. One or more electrical contacts extend into an interface chamber within the outer shield. A membrane is coupled to the housing. An alert device is coupled to the housing. The membrane in a normal state connects to the alert device to short the alert device. The membrane in an alerted state disconnects from the alert device so that the alert device is not shorted, and wherein the alert device outputs an alert signal when the alert device is not shorted.

20 Claims, 2 Drawing Sheets

(56) References Cited

U.S. PATENT DOCUMENTS

| | | | | |
|---|---|---|---|---|
| 2014/0335719 | A1* | 11/2014 | Hsu | H01R 13/6598<br>439/353 |
| 2014/0335730 | A1* | 11/2014 | Grant | G06F 21/88<br>439/620.01 |
| 2017/0194746 | A1* | 7/2017 | Freer | G01R 31/54 |
| 2019/0371159 | A1* | 12/2019 | Pham | G08B 25/016 |
| 2024/0072548 | A1* | 2/2024 | Kadirvel | G01R 31/52 |
| 2024/0404390 | A1* | 12/2024 | Donnan | G08B 21/182 |

* cited by examiner

ELECTRICAL CONNECTOR HAVING AN ANOMALY ALERT SYSTEM AND A BRITTLE MEMBRANE

BACKGROUND

Examples of the present disclosure generally relate to electrical connectors, and more particularly to systems and methods for indicating anomalies of electrical connectors.

Various electrical devices are configured to couple to other components through electrical connectors. For example, handheld smart devices such as smart phones removably couple to chargers and other electrical devices (such as speakers, computers, or the like) through cords having electrical connectors. Universal Serial Bus (USB) cords have electrical connectors at one or both ends. An RJ45 connector is another example of an electrical connector.

In general, with increased development, shapes and sizes of electrical connectors continue to change. For example, various electrical connectors are smaller than prior electrical connectors. Further, electrical connectors are used with numerous types of devices.

With continued usage, an electrical connector may exhibit one or more anomalies, such as by becoming misshapen. A misshapen connector can potentially adversely affect an electrical device. For example, if a misshapen connector is forced into an electrical interface of an electrical device, the misshapen connector can adversely affect electrical contacts and/or a structural aspect of the electrical device.

SUMMARY

A need exists for a system and method for alerting an individual that an electrical connector has an anomaly. With that need in mind, certain examples of the present disclosure provide an electrical connector including a housing including a main body and an outer shield extending from the main body. One or more electrical contacts extend into an interface chamber within the outer shield. A membrane is coupled to the housing. An alert device is also coupled to the housing.

In at least one example, the membrane in a normal state connects to the alert device to short the alert device. The membrane in an alerted state disconnects from the alert device so that the alert device is not shorted. The alert device outputs an alert signal when the alert device is not shorted.

In at least one example, the alert device is powered by an electrical device proximate to the electrical connector. The alert device when not shorted outputs the alert signal in response to being proximate to the electrical device.

In at least one example, the membrane is formed of a brittle, conductive material. For example, the membrane is formed of one or more of talc. For example, the talc can have a thickness of 1 mm or less, allowing it to be disposed between a metal sheet and plastic which positions the connectors. As another example, the membrane can be formed of a metal having a low ductility, such as tungsten and/or iron (with or without talc).

In at least one example, the membrane is disposed between the outer shield and the one or more electrical contacts. In at least one example, the membrane is disposed on one or both of an interior surface or an exterior surface of the outer shield. The membrane can be a contiguous ring in a normal state.

In at least one example, the alert device includes one or more of an antenna, a radio frequency identification (RFID) tag, or one or more light emitting diodes (LEDs).

Certain examples of the present disclosure provide a method including coupling a membrane to a housing including a main body and an outer shield extending from the main body, wherein one or more electrical contacts extend into an interface chamber within the outer shield; and coupling an alert device coupled to the housing.

In at least one example, the method also includes connecting the membrane in a normal state to the alert device to short the alert device; disconnecting the membrane in an alerted state from the alert device so that the alert device is not shorted; and outputting, from the alert device when not shorted, an alert signal.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Examples of the present disclosure provide an electrical connector having a membrane that is or otherwise includes a brittle, conductive material. The electrical connector has been used with cables for many, if not all, types of electrical devices. The membrane is disposed within the connector. A continuity measurement is used to activate a response as to the condition of the connector. When the membrane is in a normal state (for example, continuous, contiguous and unbroken), the membrane is connected to a line, and an alert device (such as an antenna) is in a shorted state. However, when the membrane is compromised (such as broken) and therefore no longer continuous, the antenna is no longer shorted, and is active. A passively powered component, such as a radio frequency identification (RFID) tag and/or a light emitting diode (LED), emits a signal when an electrical device approaches, thereby signaling that the electrical connector has an anomaly.

Figure 1:
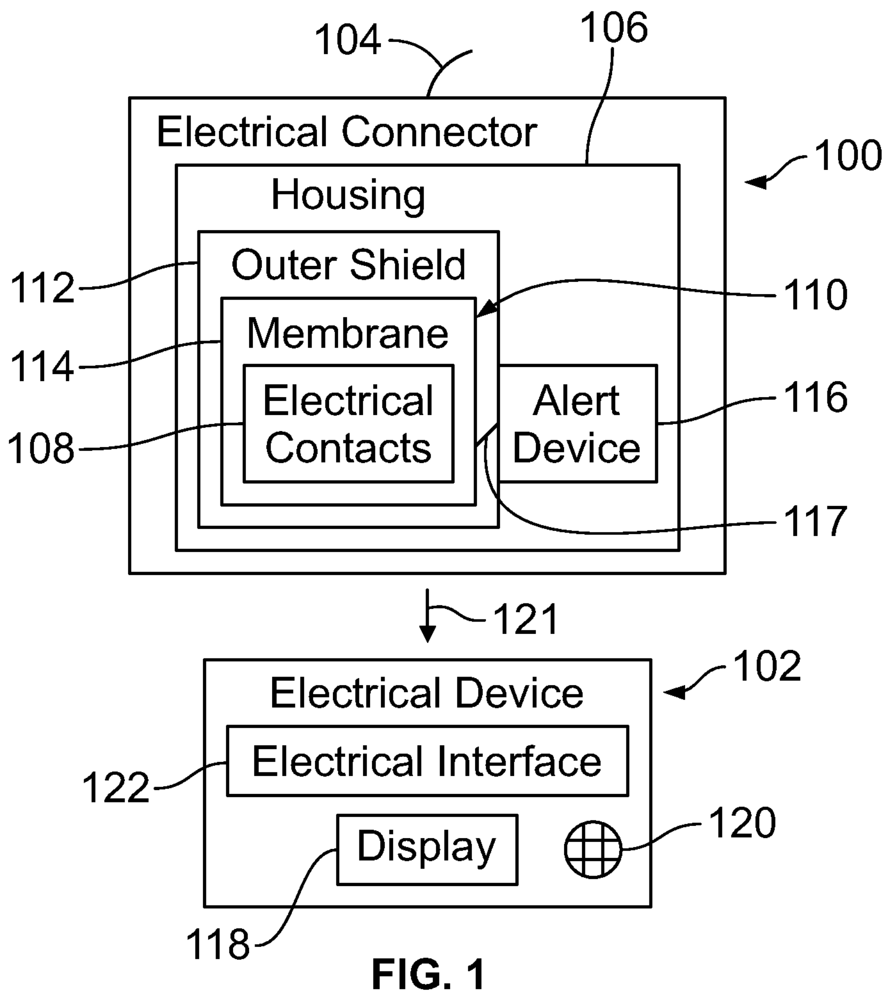
FIG. 1 illustrates a schematic block diagram of an electrical connector and an electrical device, according to an example of the present disclosure.

FIG. 1 illustrates a schematic block diagram of an electrical connector 100 and an electrical device 102, according to an example of the present disclosure. In at least one example, the electrical connector 100 is a USB connector connected to a cable or wire 104. As another example, the electrical connector 100 is an RJ45 connector connected to the cable or wire 104. Optionally, the electrical connector 100 can be various other types.

The electrical connector 100 includes a housing 106, which includes electrical contacts 108, such as electrical pins, receptacles, vias, and/or the like. The electrical contacts 108 include portions within an interface chamber 110 defined by an outer shield 112. A membrane 114 is disposed on and/or within the housing 106. For example, the membrane 114 is disposed between the outer shield 112 and the electrical contacts 108. In at least one example, the membrane 114 is disposed on an interior surface of the outer shield 112. In at least one other example, the membrane 114 is disposed on an exterior surface of the outer shield 112. In at least one other example, the membrane 114 is disposed on one or both the interior surface and the exterior surface of the outer shield 112.

The membrane 114 is or includes a brittle line of material. For example, the membrane 114 is formed of or otherwise includes talc can having a thickness of 1 mm or less, allowing it to be disposed between a metal sheet and plastic which positions the connectors. As another example, the membrane can be formed of a metal having a low ductility, such as tungsten and/or iron (with or without talc). In at least one example, the membrane 114 provide a contiguous ring of material around the electrical contacts 108 and/or the interface chamber 110. In at least one other example, the membrane 114 includes a plurality of linear segments separated by gaps.

The housing 106 also includes an alert device 116, such as an antenna, an RFID tag, and/or one or more LEDs. In at least one example, the alert device 116 includes a passively powered chip (such as an integrated chip, one or more processors or microprocessors, and/or the like) coupled to an antenna. The alert device 116 is secured to a portion of the housing 106. For example, the alert device 116 extends from an outer portion of the housing 106, such as an exterior portion of the outer shield 112. As another example, the alert device 116 extends from a main body of the housing 106 from which the outer shield 112 extends. The alert device 116 includes or otherwise connects to a line 117, such as an electrical trace, contact, or the like.

The electrical connector 100 is configured to electrically mate with the electrical device 102. Examples of the electrical device 102 include a handheld smart device (such as a smart phone or smart table), a laptop computer, a personal computer, a speaker, a television, and/or the like. In at least one example, the electrical device 102 includes a display 118, such an electronic monitor, electronic screen, light-emitting display (for example, one or more LEDs), and/or the like. Optionally, the electrical device 102 may not include a display. In at least one example, the electrical device 102 includes an audio speaker 120. Optionally, the electrical device 102 may not include the audio speaker 120.

The electrical device 102 includes an electrical interface 122 that is configured to mate with the electrical contacts 108 of the electrical connector 100. The outer shield 112 is configured to mate with the electrical interface 122 so that the electrical contacts 108 of the electrical connector 100 electrically mate with reciprocal electrical contacts of the electrical interface 122.

In operation, the electrical connector 100 mates with the electrical device 102 when the outer shield 112 is in a normal operational state. In the normal operational state, the outer shield 112 is properly formed to mate with the electrical interface 122. When the outer shield 112 is in the normal operational state, the membrane 114, which can be coupled directly to the outer shield 112, is in a normal state. In the normal state, the outer shield 112 is continuous (for example, properly formed with no breaks therein). For example, the membrane 114 in the normal state provides a contiguous ring on and/or within the outer shield 112. When the membrane 114 is in the normal state, the alert device 116 is shorted, such as through the line 117 connecting to the membrane 114. When the alert device 116 is shorted, the alert device 116 is inactive, and does not transmit an alert signal.

If, however, the outer shield 112 is subject to a force that causes an anomaly, such as a misshapen portion (for example, a dent, a divot, a crack, and/or the like), the membrane 114 is also affected. As such, the membrane 114 is in an altered state, such that at least a portion is bent, cracked, broken, and/or the like. When the membrane 114 is in the alerted state, the alert device 116 is no longer shorted (for example, the line 117 no longer connects the membrane 114 to the alert device 116), and the alert device 116 is configured to emit an alert signal when the alert device 116 is energized. In at least one other example, the alert device 116 is initially shorted by being disconnected from the membrane 114, and the membrane 114 in the altered state makes contact with the alert device 116 so that the alert device 116 is no longer shorted.

In at least one example, when the electrical connector 100 is disposed in close proximity to the electrical device 102 (such as within 1 foot or less), the electrical device 102 can provide power to the alert device 116, which can be an RFID tag, an LED, and/or the like. As the alert device 116 is no longer shorted, and is powered, the alert device 116 is in an active state and outputs an alert signal 121. In at least one example, when the alert device 116 is an antenna or an RFID tag, the alert signal 121 is received by the electrical device 102, and an alert warning included on the alert signal 121 can be shown on the display 118 and/or broadcast from the audio speaker 120. As another example, the alert device 116 can include one or more LEDs. The alert signal 121 is shown on the electrical connector 100 through the LED(s) being illuminated. Optionally, the alert device 116 can include a power source, such as a battery, which provides power to the alert device 116 when the alert device 116 is no longer shorted. In this manner, the alert device 116 can be in an active state and emit the alert signal 121 whether or not in close proximity to the electrical device 102.

In this manner, when the membrane 114 is compromised (such as by being cracked, dented, or otherwise broken), the alert device 116 is no longer shorted, and is configured to be in an active state and emit the alert signal 121. Information related to the alert signal 121 can be shown on the display 118 of the electrical device 102, broadcast through the audio speaker 120 of the electrical device 102, and/or shown by the alert device 116 itself (such as if the alert device 116 includes one or more LEDs). Accordingly, the alert signal 121 provides an alert to an individual that the electrical connector 100 includes an anomaly, and should not be connected to the electrical device 102.

Figure 2:
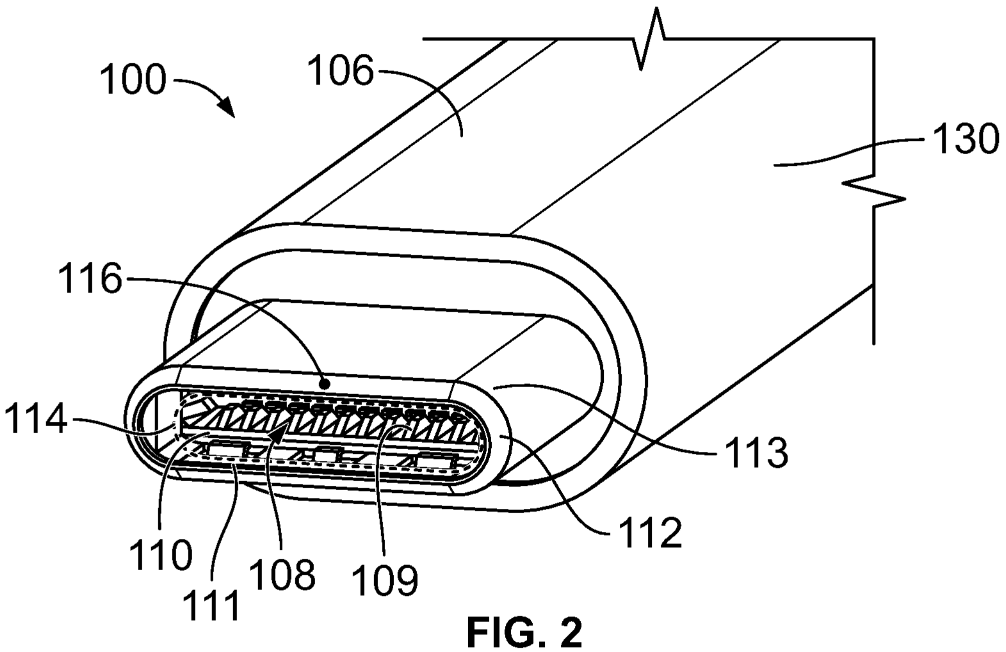
FIG. 2 illustrates a perspective front view of the electrical connector, according to an example of the present disclosure.

FIG. 2 illustrates a perspective front view of the electrical connector 100, according to an example of the present disclosure. The housing 106 includes the outer shield 112 extending outwardly from the main body 130. The electrical contacts 108 have inner portions (not shown) secured within the main body 130, and outer portions 109 extending into the interface chamber 110. The outer shield 112 is or includes a contiguous wall forming a ring that surrounds the interface chamber 110. The membrane 114 is secured to an interior surface 111 of the outer shield 112. In at least one example, the membrane 114 is a contiguous ring of material that extends over the interior surface 111. In at least one other example, the membrane 114 can be secured to the exterior surface 113 of the outer shield 112. In at least one other example, the membrane 114 can be secured to both the interior surface 111 and the exterior surface 113. In at least one other example, the membrane 114 can be embedded within the outer shield 112.

The alert device 116 can be secured to the exterior surface 113 of the outer shield 112. Optionally, the alert device 116 can be secured to the interior surface 111 of the outer shield 112. As another example, the alert device 116 can be embedded within the outer shield 112. In at least one other example, the alert device 116 can be secured onto and/or within the main body 130. In at least one example, the alert device 116 can be secured to the interior surface 111, the exterior surface 113, embedded within the outer shield 112, and/or secured onto and/or within the main body 130.

Referring to FIGS. 1 and 2, the electrical connector 100 includes the housing 106 including the main body 130 and the outer shield 112 extending from the main body 130. One or more electrical contacts 108 extend into the interface chamber 110 within the outer shield 112. The membrane 114 is coupled to the housing 106. The alert device 116 is coupled to the housing 106. In at least one example, the membrane 114 in the normal state connects to the alert device 116 to short the alert device 116. The membrane 114 in the altered state disconnects from the alert device 116 so that the alert device 116 is not shorted. Consequently, the alert device 116 outputs the alert signal 121 when the alert device 116 is not shorted.

In at least one example, the alert device 116 is powered by the electrical device 102 proximate to (such as within 1 foot or less) the electrical connector 100. In this example, the alert device 116, when not shorted, outputs the alert signal 121 in response to being proximate to the electrical device 102.

Optionally, the membrane 114 is the normal state does not connect to the alert device 116 to short the alert device 116. Instead, the alert device 116 is already shorted. When the membrane 114 is compromised (and enters the alerted state), the membrane 114, being formed of a conductive material, connects to the alert device 116 (such as via the line 117), and the alert device 116 is no longer shorted, but is configured to be in the active state.

Figure 3:
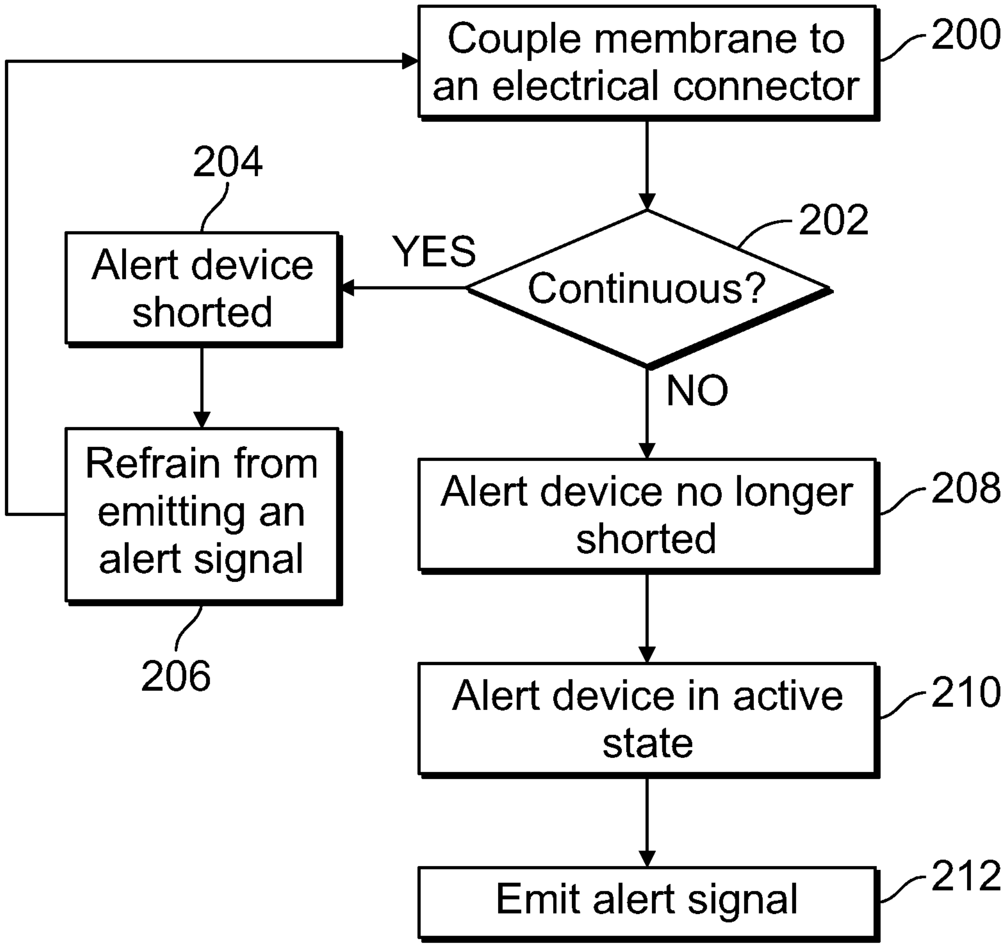
FIG. 3 illustrates a flow chart of a method, according to an example of the present disclosure.

FIG. 3 illustrates a flow chart of a method, according to an example of the present disclosure. Referring to FIGS. 1-3, at 200, the membrane 114 is coupled to the electrical connector 100. At 202, it is determined if the membrane 202 is continuous (that is, in the normal state). If the membrane 202 is continuous, the method proceeds to 204, at which the alert device 116 remains shorted (and inactive). As such, at 206, the alert device 116 refrains from emitting the alert signal.

If, however, the membrane 114 is not continuous at 202 (that is, in the alerted state), the method proceeds from 202 to 208, at which the alert device 116 is no longer shorted, and is in the active state at 210 (such as by being powered through its own power source, and/or being in close proximity to the electrical device 102, which provides sufficient power to activate the alert device 116). At 212, in the active state, the alert device 116 emits the alert signal 121, as described herein.

Further, the disclosure comprises embodiments according to the following clauses:

Claim 1: An electrical connector comprising:
- a housing including a main body and an outer shield extending from the main body, wherein one or more electrical contacts extend into an interface chamber within the outer shield;
- a membrane coupled to the housing; and
- an alert device coupled to the housing.

Claim 2. The electrical connector of Claim 1, wherein the membrane in a normal state connects to the alert device to short the alert device, and wherein the membrane in an alerted state disconnects from the alert device so that the alert device is not shorted, and wherein the alert device outputs an alert signal when the alert device is not shorted.

Claim 3. The electrical connector of Claim 2, wherein the alert device is powered by an electrical device proximate to the electrical connector, and wherein the alert device when not shorted outputs the alert signal in response to being proximate to the electrical device.

Claim 4. The electrical connector of claim 1, wherein the membrane is formed of a brittle, conductive material.

Claim 5. The electrical connector of claim 1, wherein the membrane is formed of one or more of talc, tungsten, or iron.

Claim 6. The electrical connector of claim 1, wherein the membrane is disposed between the outer shield and the one or more electrical contacts.

Claim 7. The electrical connector of claim 1, wherein the membrane is disposed on one or both of an interior surface or an exterior surface of the outer shield.

Claim 8. The electrical connector of claim 1, wherein the membrane is a contiguous ring in a normal state.

Claim 9. The electrical connector of claim 1, wherein the alert device comprises one or more of an antenna, a radio frequency identification (RFID) tag, or one or more light emitting diodes (LEDs).

Claim 10. A method comprising:
- coupling a membrane to a housing including a main body and an outer shield extending from the main body, wherein one or more electrical contacts extend into an interface chamber within the outer shield; and
- coupling an alert device coupled to the housing.

Claim 11. The method of Claim 10, further comprising:
- connecting the membrane in a normal state to the alert device to short the alert device;
- disconnecting the membrane in an alerted state from the alert device so that the alert device is not shorted; and
- outputting, from the alert device when not shorted, an alert signal.

Claim 12. The method of Claim 11, further comprising powering the alert device by an electrical device proximate to the electrical connector, and wherein the outputting comprises outputting the alert signal in response to the electrical connector being proximate to the electrical device when the alert device is not shorted.

Claim 13. The method of claim 10, wherein the membrane is formed of a brittle, conductive material.

Claim 14. The method of claim 10, wherein the membrane is formed of one or more of talc, tungsten, or iron.

Claim 15. The method of claim 10, wherein the coupling the membrane comprises disposing the membrane between the outer shield and the one or more electrical contacts.

Claim 16. The method of claim 10, wherein the coupling the membrane comprised disposing the membrane on one or both of an interior surface or an exterior surface of the outer shield.

Claim 17. The method of claim 10, wherein the membrane is a contiguous ring in a normal state.

Claim 18. The method of claim 10, wherein the alert device comprises one or more of an antenna, a radio frequency identification (RFID) tag, or one or more light emitting diodes (LEDs).

Claim 19. An electrical connector comprising:

a housing including a main body and an outer shield extending from the main body, wherein one or more electrical contacts extend into an interface chamber within the outer shield;

a membrane formed of a brittle, conductive material coupled to the housing, wherein the membrane is disposed between the outer shield and the one or more electrical contacts, and wherein the membrane is a contiguous ring in a normal state; and an alert device coupled to the housing, wherein the alert device comprises one or more of an antenna, a radio frequency identification (RFID) tag, or one or more light emitting diodes (LEDs).

Claim 20. The electrical connector of claim 19, wherein the membrane in the normal state connects to the alert device to short the alert device, and wherein the membrane in an alerted state disconnects from the alert device so that the alert device is not shorted, and wherein the alert device outputs an alert signal when the alert device is not shorted.

As described herein, examples of the present systems and methods for alerting an individual that an electrical connector has an anomaly.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An electrical connector comprising:

a housing including a main body and an outer shield extending from the main body, wherein one or more electrical contacts extend into an interface chamber within the outer shield;

a membrane coupled to the housing; and an alert device coupled to the housing, wherein the membrane in a normal state connects to the alert device to short the alert device, wherein the membrane in an alerted state disconnects from the alert device so that the alert device is not shorted, and wherein the alert device outputs an alert signal when the alert device is not shorted.

2. The electrical connector of claim 1, wherein the alert device is powered by an electrical device proximate to the electrical connector, and wherein the alert device when not shorted outputs the alert signal in response to being proximate to the electrical device.

3. The electrical connector of claim 1, wherein the membrane is formed of a brittle, conductive material.

4. The electrical connector of claim 1, wherein the membrane is formed of one or more of talc, tungsten, or iron.

5. The electrical connector of claim 1, wherein the membrane is disposed between the outer shield and the one or more electrical contacts.

6. The electrical connector of claim 1, wherein the membrane is disposed on one or both of an interior surface or an exterior surface of the outer shield.

7. The electrical connector of claim 1, wherein the membrane is a contiguous ring in a normal state.

8. The electrical connector of claim 1, wherein the alert device comprises one or more of an antenna, a radio frequency identification (RFID) tag, or one or more light emitting diodes (LEDs).

9. A method comprising:
- coupling a membrane to a housing including a main body and an outer shield extending from the main body, wherein one or more electrical contacts extend into an interface chamber within the outer shield;
- coupling an alert device to the housing;
- connecting the membrane in a normal state to the alert device to short the alert device;
- disconnecting the membrane in an alerted state from the alert device so that the alert device is not shorted; and
- outputting, from the alert device when not shorted, an alert signal.

10. The method of claim 9, further comprising powering the alert device by an electrical device proximate to the electrical connector, and wherein the outputting comprises outputting the alert signal in response to the electrical connector being proximate to the electrical device when the alert device is not shorted.

11. The method of claim 9, wherein the membrane is formed of a brittle, conductive material.

12. The method of claim 9, wherein the membrane is formed of one or more of talc, tungsten, or iron.

13. The method of claim 9, wherein the coupling of the membrane comprises disposing the membrane between the outer shield and the one or more electrical contacts.

14. The method of claim 9, wherein the coupling of the membrane comprises disposing the membrane on one or both of an interior surface or an exterior surface of the outer shield.

15. The method of claim 9, wherein the membrane is a contiguous ring in a normal state.

16. The method of claim 9, wherein the alert device comprises one or more of an antenna, a radio frequency identification (RFID) tag, or one or more light emitting diodes (LEDs).

17. An electrical connector comprising:
- a housing including a main body and an outer shield extending from the main body, wherein one or more electrical contacts extend into an interface chamber within the outer shield;
- a membrane formed of a brittle, conductive material coupled to the housing, wherein the membrane is disposed between the outer shield and the one or more electrical contacts, and wherein the membrane is a contiguous ring in a normal state; and
- an alert device coupled to the housing, wherein the alert device comprises one or more of an antenna, a radio frequency identification (RFID) tag, or one or more light emitting diodes (LEDs).

18. The electrical connector of claim 17, wherein the membrane in the normal state connects to the alert device to short the alert device, wherein the membrane in an alerted state disconnects from the alert device so that the alert device is not shorted, and wherein the alert device outputs an alert signal when the alert device is not shorted.

19. An electrical connector comprising:
- a housing including a main body and an outer shield extending from the main body, wherein one or more electrical contacts extend into an interface chamber within the outer shield;
- a membrane coupled to the housing, wherein the membrane is formed of a brittle, conductive material; and
- an alert device coupled to the housing.

20. The electrical connector of claim 19, wherein the membrane is formed of one or more of talc, tungsten, or iron.

* * * * *